United States Patent [19]
Eglinton

[11] Patent Number: 5,423,588
[45] Date of Patent: Jun. 13, 1995

[54] LOAD COVER

[76] Inventor: Danny J. Eglinton, Walker House, 1815 London Rd., Leigh-on-Sea, Essex SS9 2SY, England

[21] Appl. No.: 167,546

[22] Filed: Dec. 15, 1993

[30] Foreign Application Priority Data

Dec. 15, 1992 [GB] United Kingdom ............... 9226110
Sep. 17, 1993 [GB] United Kingdom ............... 9319292

[51] Int. Cl.6 ............................................. B60J 11/00
[52] U.S. Cl. ................................. 296/98; 296/136; 224/324; 224/328
[58] Field of Search ................. 296/98, 100, 136; 224/316, 324, 328

[56] References Cited

U.S. PATENT DOCUMENTS

| | | | |
|---|---|---|---|
| 1,918,423 | 7/1933 | Persinger | 296/98 X |
| 2,028,209 | 1/1936 | Hart | 296/98 |
| 3,146,824 | 9/1964 | Veilleux | 296/98 X |
| 3,955,732 | 5/1976 | Böschen | 224/328 |
| 4,068,885 | 1/1978 | Berger | 296/98 X |
| 4,126,351 | 11/1978 | Peteretti | 296/98 X |
| 4,131,269 | 12/1978 | Brattrud | 296/95.1 |
| 4,516,802 | 5/1985 | Compton | 296/98 |
| 4,727,898 | 3/1988 | Guma | 296/98 X |
| 4,958,881 | 9/1990 | Piros | 296/98 |
| 4,966,406 | 10/1990 | Karasik et al. | 296/98 |
| 5,039,159 | 8/1991 | Bonner | 296/136 |
| 5,096,107 | 3/1992 | VanSon | 224/328 |
| 5,129,698 | 7/1992 | Cohrs et al. | 296/98 |

FOREIGN PATENT DOCUMENTS

| | | | |
|---|---|---|---|
| 1073614 | 9/1954 | France | 224/328 |
| 94593 | 7/1959 | Norway | 224/328 |
| 668398 | 12/1988 | Switzerland | 296/98 |

Primary Examiner—Joseph Pape
Attorney, Agent, or Firm—Andrus, Sceales, Starke & Sawall

[57] ABSTRACT

A load cover for use in association with a vehicle roof-rack or other load-carrying area has a housing in which is located a spring-loaded roller, a substantially inextensible web being wound on the roller and having a bar attached to the free end of the web. Folds are formed along the length of the web, to provide a central region, two outer wings extending along the edge regions of the web, and folded-back intermediate zones, the wings being connected together by elastic strips. Once the web has been pulled out of the housing to extend over a carried load, the bar is made fast, and then the wings are pulled down to cover the sides of the load and are tied in place. After use, and on releasing the web, it returns into the housing, by being wound on the roller, until required for use again.

19 Claims, 6 Drawing Sheets

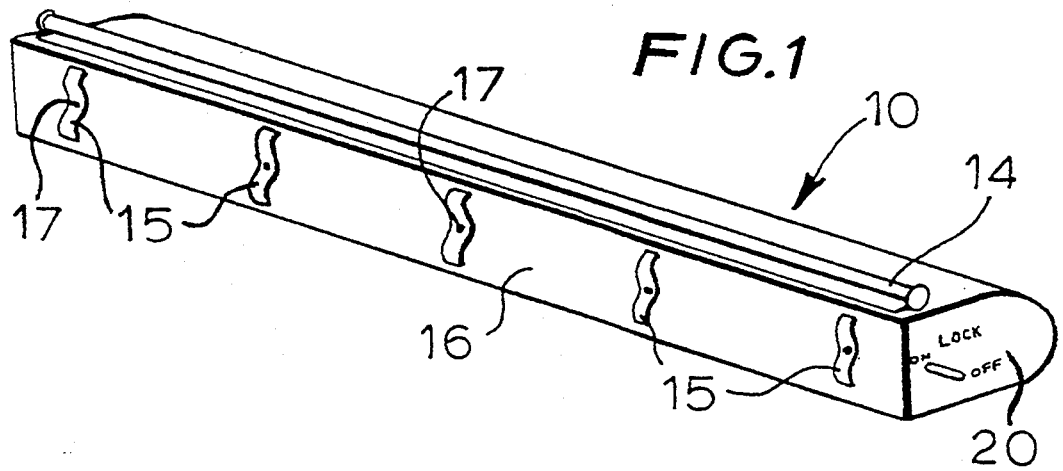
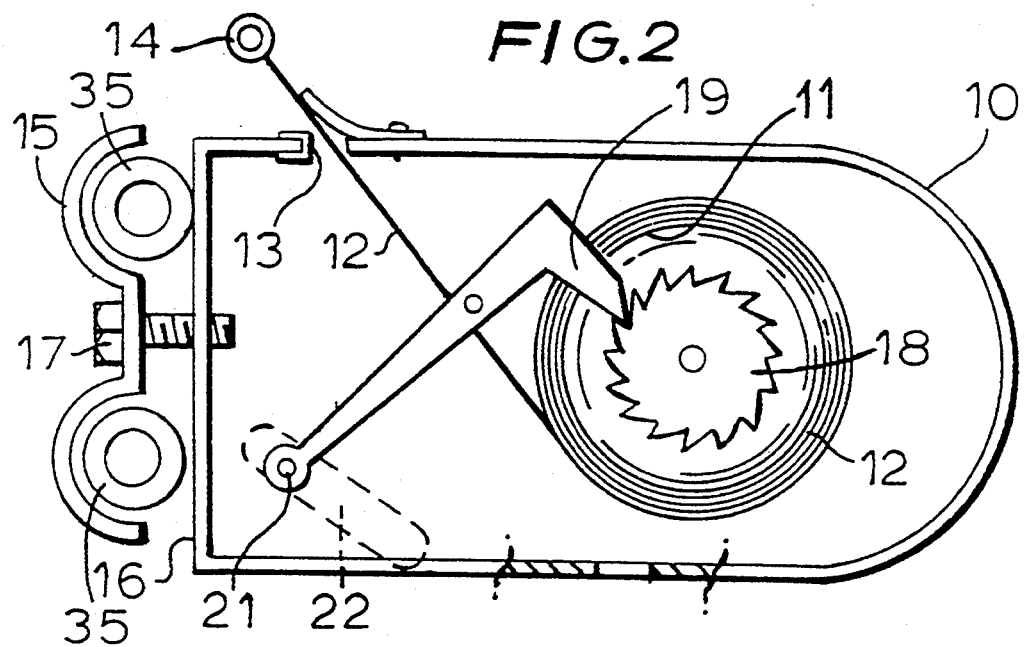

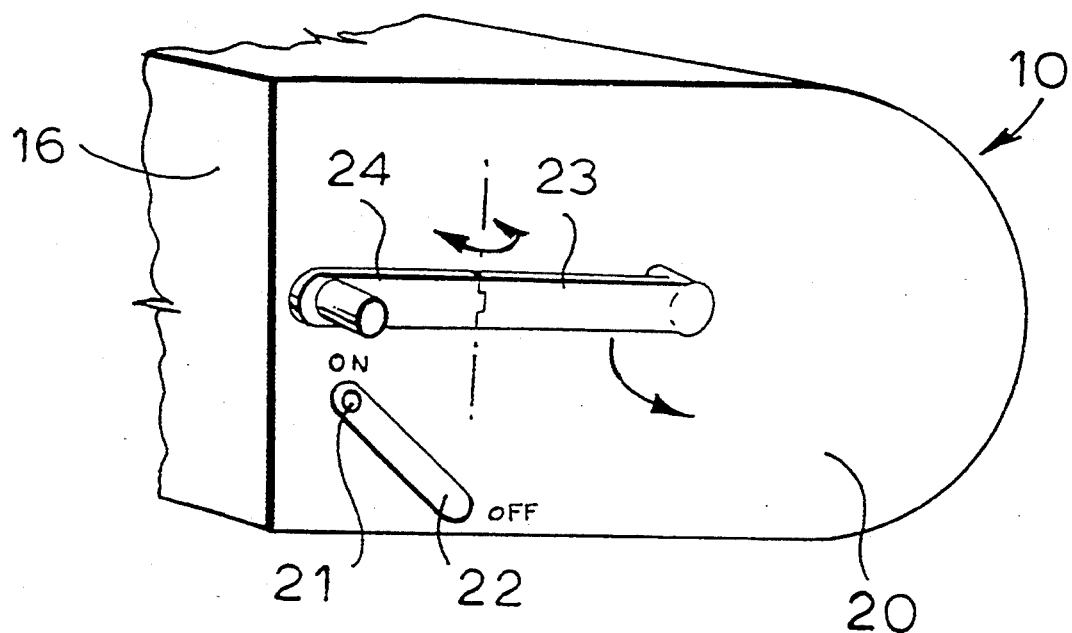
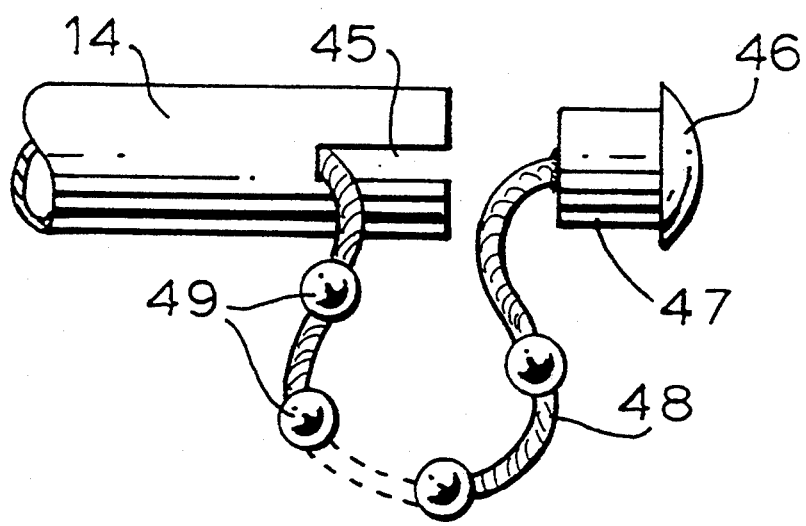

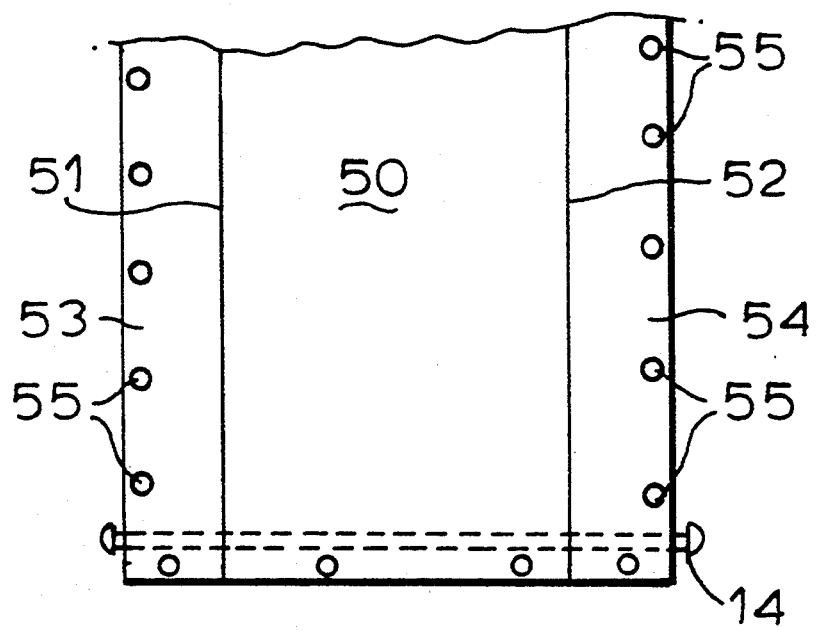
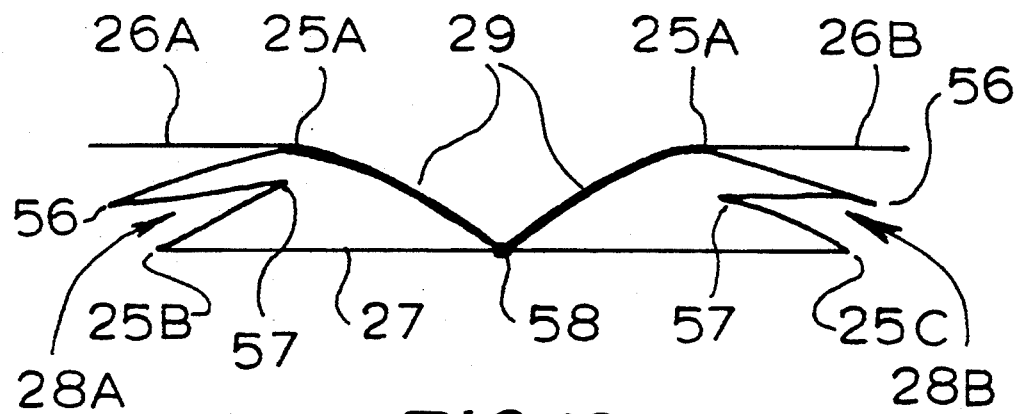

5,423,588

LOAD COVER

FIELD OF THE INVENTION

This invention relates to a cover for goods carried on a vehicle and particularly—though not exclusively—concerns such a cover suitable for use in conjunction with a roof-rack mounted on a motor vehicle, to permit the covering of goods carried thereon.

BACKGROUND OF THE INVENTION

Many owners of passenger cars or estate cars employ a roof-rack, either to permit the carrying of a load which will not fit within the main body of the vehicle, on account of the physical dimensions of that load, or to increase the overall load-carrying capacity, when the available space within the body of the vehicle has already been filled. In either case, a load carried on a roof-rack is exposed to the elements, unless that load is covered by a tarpaulin, plastic sheet or the like. However, it can be difficult to securely tie-down such a cover, to prevent the cover flapping or filling with air when the vehicle is under way, for a number of reasons. For example, the load itself must be tied down securely to the roof-rack, and the ropes or cords used to do this may then inhibit the fitting of a cover closely over the load. On the other hand, if the cover is first placed over the load, the presence of the cover may inhibit the secure tying-down of the load, and moreover it may not be possible adequately to tension the cover, on account of interference between the cover and the ropes or cords tying down the load.

Another difficulty associated with the use of a cover over a load carried on a roof-rack is that if the cover is sufficiently large to extend over the largest load that is likely to be carried, then it will be much too big for a relatively small load. In such a case, the excess material of the cover must be made fast—but again, this can be relatively difficult to achieve in such a way that it will not flap or billow, when the vehicle is underway. Also, when the cover is not in use, it must be stowed within the vehicle, taking up space.

OBJECTS AND SUMMARY OF THE INVENTION

It is a principal aim of the present invention to provide a cover suitable for use in conjunction with a roof-rack or other load-carrying area, and which at least mitigates the disadvantages discussed above, of using a conventional loose tie-down cover.

According to this invention, there is provided a cover for goods carried on a vehicle, comprising a carrier adapted to be affixed to a part of the vehicle adjacent a load-carrying area thereof, a roller rotatably mounted on the carrier, releasable lock means to restrain rotation of the roller, and a web of flexible sheet-like material wound on the roller, the free end of the web having attachment means to permit the securing of the free end to another part of the vehicle also adjacent the load carrying area.

Though the cover of this invention is primarily intended for use in conjunction with a roof-rack mounted on the roof of a motor vehicle, and will hereinafter be discussed solely in conjunction with that intended use, nevertheless it will be appreciated that the cover may be used to cover loads carried in the open other than on a roof-rack of a car or estate car—for example, to cover loads carried on a flat-bed truck or on a pick-up truck.

By way of example only, one specific embodiment of a cover assembly constructed and arranged in accordance with the present invention and intended for use in association with a roof-rack will be described in detail hereinbelow, reference being made to the accompanying drawings.

BRIEF DESCRIPTION OF THE DRAWINGS

FIG. 1 is a general perspective view of the embodiment of a cover assembly of this invention with the cover rolled-up;

FIG. 2 is an end view of the cover assembly of FIG. 1, but with an end plate removed for clarity;

FIG. 3 is an end view of the cover assembly;

FIG. 10 is a detail view of a modified form of bar for the free end of the web;

FIG. 11 is a plan view of a part of an alternative web; and

FIG. 12 is a diagrammatic cross-sectional view through a web similar to that of FIG. 5 but including two extra folds in the intermediate zones thereof.

DESCRIPTION OF THE PREFERRED EMBODIMENTS

Figure 4:
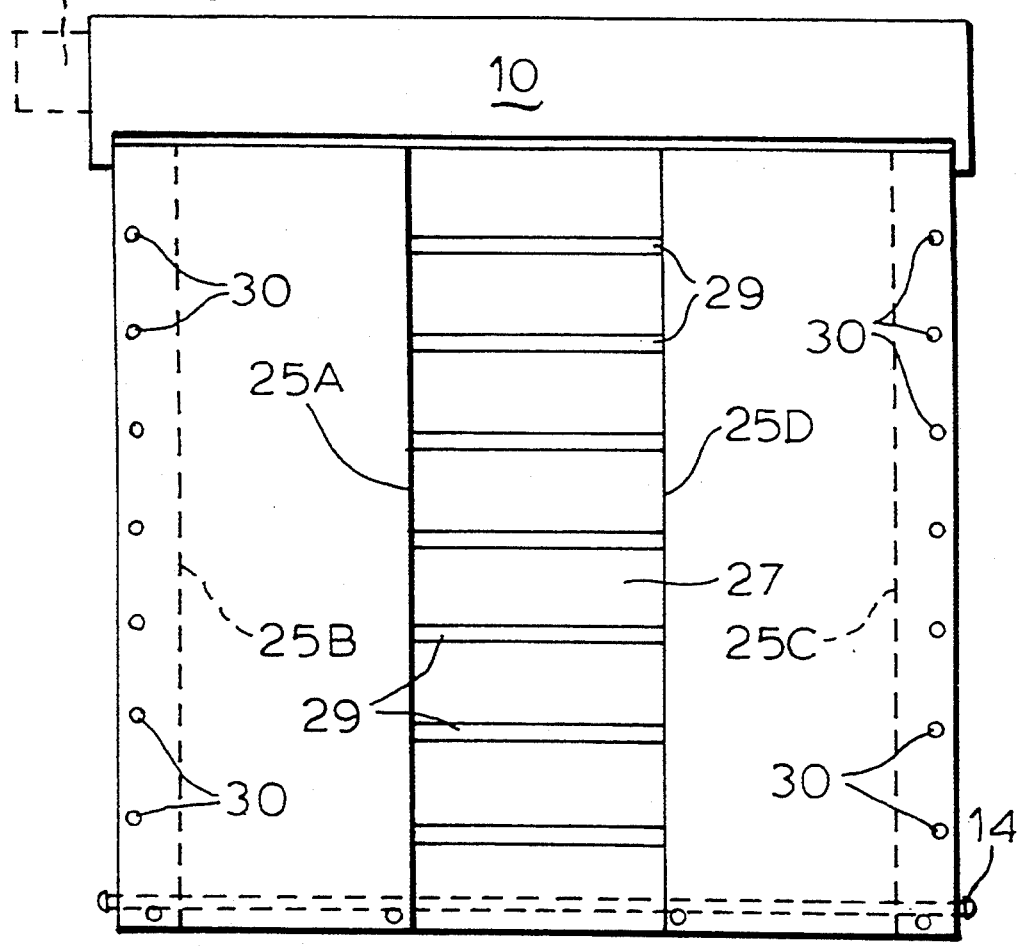
FIG. 4 is a plan view of the web used in the cover assembly, when partially drawn out of the housing.

The cover of this invention utilises a web of flexible sheet-like material wound on a roller, much in the manner of a roller-blind for a window. In order to prevent the web billowing when in use and the vehicle is under way, it is preferred for the web to comprise an elongate sheet of a substantially inextensible material. Suitable materials may include a plastics sheet, a plastics-coated textile material coated for example with vinyl, or a textile material otherwise coated or impregnated to render it substantially waterproof.

Once the carrier has been secured to the vehicle or to an appropriate part of a roof-rack mounted on the vehicle, such as on or adjacent the front member of a roof-rack, and the load has been located on the roof-rack and securely tied down, the web may be pulled out, off the roller, to extend over the load, whereafter the free end of that web may be attached to some adjacent part of the vehicle or to a member at the other end of the roof-rack. To facilitate this, the free end of the web may be secured to a substantially rigid element extending transversely of the web, and around which element ropes or cords may be passed, to tie that element to the roof-rack. Alternatively, the element may mechanically engage with clips provided on the roof-rack for that purpose, so as to make fast the free end of the web. The web may then be tensioned by re-winding excess on the roller, and the lock means engaged, so as to prevent further unwinding of the web from the roller. A winding handle may be provided for the roller, to allow tensioning of the web, or it could be tensioned with an integral electric motor.

A cover as described above will serve to cover only the front, top and rear of a carried load, presuming the roller is mounted at the front or the rear of a roof-rack, leaving the sides of the carried load still substantially exposed to the elements. The cover may be modified to include elastically-stretchable sheet-like marginal portions along the long edges of the web, which portions are provided with means permitting the long free edges thereof to be secured to appropriate parts of the motor vehicle. In this way, said portions may be stretched downwardly at least partially to cover the sides of a carried load, following the covering of the load by the web. For example, ropes or cords may be used to stretch and then tie down the marginal portions, so as to give at least some protection to the sides of a carried load.

In an alternative and preferred arrangement, the web of sheet-like material is folded along at least four lines each of which extends substantially parallel to the length of the web, whereby there are defined two outer wings, a central region, and a pair of intermediate zones which extend between a respective wing and the central region, there being resiliently extensible means extending between opposed portions of the wings and at least partially overlying the central region.

When only four fold lines are provided, there will be one central region, two wings, and two intermediate zones disposed between the central region and the respective wings. Further fold lines could be provided within each intermediate zone, whereby each such zone may itself be folded back on itself in a concertina-like manner, these folded back parts unfolding as required as the wings are pulled down to cover a load.

Preferably, the resiliently extensible means comprises a plurality of separate, resiliently extensible strips arranged with the strips parallel to one another and spaced apart along the length of the web. Each such strip may extend between, and be secured at its two ends to, the two wings respectively. Alternatively, each such strip may be secured at one end to a wing, and at its other end to the central region of the web of sheet-like material.

The material of the cover may be substantially inextensible, all of the resilience required to stretch the cover over a load being provided by the resiliently extensible means extending between the two wings. Preferably, the web is of a weather-proof synthetic textile material or fabric, such as of a polyamide. The web may be woven or otherwise formed by techniques known in the art to form a flexible, water-impervious material.

The roller may be mounted within a housing having a slot through which the web passes, to permit unwinding of the web from, and winding of the web into, the roller. Such a housing may be aerodynamically shaped, to decrease wind resistance when mounted on a roof-rack, but the cover is not required for use as no load is being carried.

As discussed above, the housing for the web, may be affixed either to a part of the vehicle or to a roof-rack. Alternatively, the housing may be formed as an integral part of a roof-rack, for this much facilitates the mounting of the overall assembly on a vehicle. Nevertheless, and especially where no roof-rack is to be provided, the housing may still be formed as a separate entity, for affixing directly to a suitable part of a vehicle.

Referring now to the drawings, which show an actual embodiment of a cover for use with a roof-rack, as can be seen from FIGS. 1 and 2, the cover assembly comprises an elongate housing 10 having a generally D-shaped cross-sectional profile and within which is rotatably mounted an elongate roller 11. The roller 11 is hollow and contains a helical spring (not shown) secured at one end to the roller and at its other end to the housing 10, such that the spring exerts a rotational bias on the roller 11, in the clockwise sense as viewed in FIG. 2. A web 12 of cover material is wound around the roller 11, and emerges through an elongate slot 13 formed in the housing 10 and fitted with a rubber sealing lip. The free end of the web 12 is secured to a bar 14, externally of the housing 10, such that the bar prevents the web 12 from becoming completely wound on to the roller 11, under the action of the spring.

The housing 10 is provided with a plurality of spaced-apart mounting clips 15 on face 16 of the housing. Each of these clips can be tightened by means of a bolt 17, screwed into a threaded hole in face 16 of the housing. These bolts 17 may have security heads to resist theft of the assembly.

A locking mechanism (FIG. 2) is provided for the roller 11, the mechanism comprising a ratchet wheel 18 secured coaxially to one end of the roller, a pawl 19 being mounted on end plate 20 of the housing, to be movable into and out of engagement with the ratchet wheel 18. The pawl 19 conveniently is pivoted to the inside of the plate 20, and has an operating knob 21 projecting through a slot 22 in that end plate. A frictional device may be provided to resist pivoting movement of the pawl 19, and so to maintain it in the position to which it has been set by means of the knob 21.

As shown in FIG. 3, a winding handle is provided for the roller 11, to allow the web 12 to be tensioned. The handle has a first part 23 attached to the roller spindle, and a second part 24 hinged to the first part, and which may be folded over the first part, when not in use. An electric motor, shown in phantom lines at 121 in FIG. 4, may be arranged to effect rotation of the roller 11, to eliminate the need to use the winding handle.

The web 12 is illustrated in more detail in FIGS. 3 and 4, and comprises an elongate sheet for example of a weather-proof light-weight nylon material. The web is wound on the roller within the housing and in FIG. 1 part of the length of that web is shown extending from the housing. The web has four folds 25A,25B,25C and 25D extending parallel to one another and to the length of the web, whereby the web is divided into two outer wings 26A and 26B, a central region 27 and two intermediate zones 28A and 28B, extending between the respective wings and the central region. The inner parts of the wings 26A and 26B are linked by a series of transversely extending elastically-extensible strips 29, the strips being equally-spaced along the length of the web. These strips may be sewn both to the wings and the intermediate zones, in the region of the fold lines 25A and 25D.

Suitable means—such as a series of holes 30, provided with eyelets or other reinforcements—may be provided along the outer edges of the wings 26A and 26B to allow the cover to be tied down over a load.

In the alternative, a cord 31 (FIG. 8) may extend along the free edge of each wing 26A and 26B, the free edge 126 being folded back on itself and secured to the main part of the wings, with openings 127 formed in the formed in the folded-back part along the length of that part, to define tubular pockets through which the cord 31 may extend. The cord itself may be substantially inextensible, or an elastic cord, as desired.

Figure 7:
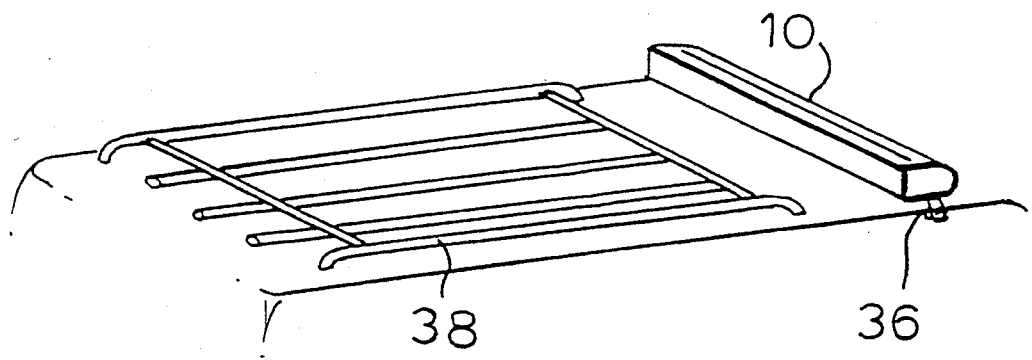
FIG. 7 is a diagrammatic view of the cover housing mounted on a car roof.

As shown in FIG. 2, the housing 10 may be secured to two members 35 extending along the front edge of a conventional design of roof-rack, using the clips 15, tightened down by means of the respective bolts 17. For other designs of roof-rack, it may be necessary to provide differently-shaped clips. Alternatively, the housing may be arranged to be an integral part of a roof-rack. Yet another possibility would be to mount the housing 10 directly to the gutter of a vehicle, as shown in FIG. 7, using clips 36 especially designed for this purpose and connected to the end plates of the housing 10. In this case, the housing should be mounted adjacent the front of a conventional roof-rack 38, as shown in FIG. 7.

Figure 6:
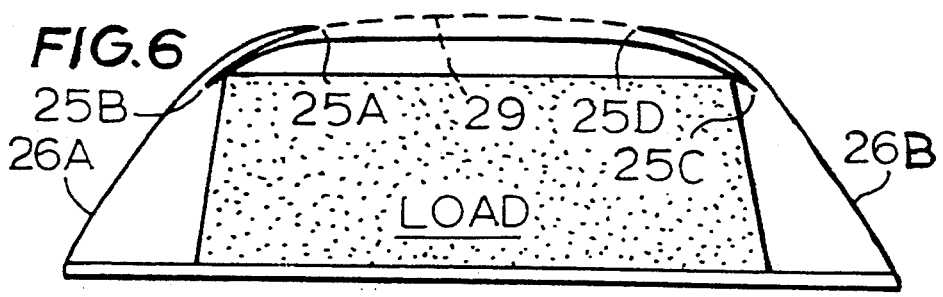
FIG. 6 is a cross-sectional view through the cover of FIG. 4, when stretched over a load on a roof-rack.
Figure 8:
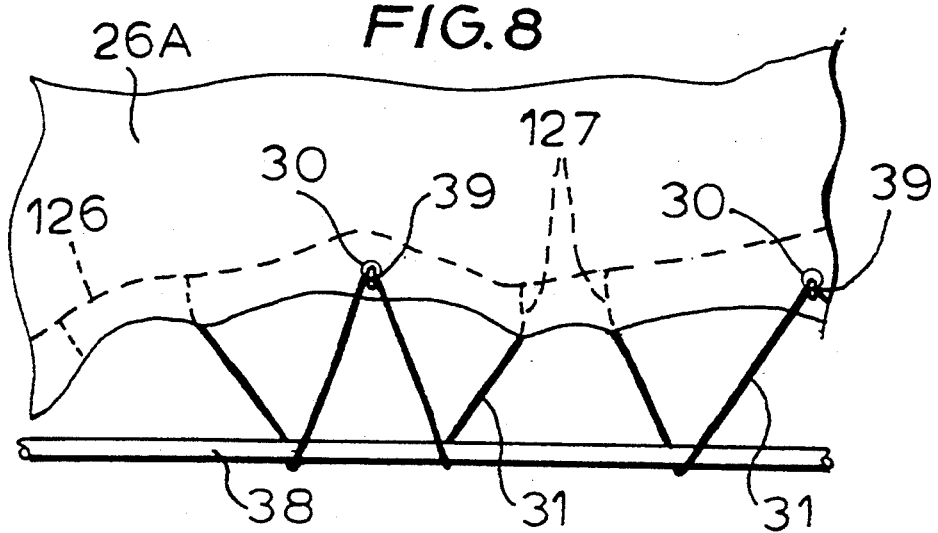
FIG. 8 is a diagrammatic partial illustration of the cover in use to protect a load.

Once a load has been securely tied down to the roof-rack, the lock mechanism on the roller 11 is released, and the web 12 pulled out of the housing 10 so as to extend over the carried load. The bar 14 is tied down with a suitable cord (or as hereinafter described with reference to FIG. 10) to the roof-rack at the end of the load remote from the housing 10, and then the web is tensioned using the handle 23,24. Covering of the load is completed by pulling down sideways the wings 26A, 26B, and tying or otherwise securing the wings to longitudinal members 38 of the roof-rack. This may be done by using cord (or rope) 31 together with hooks 39 connected into eyelets 30, as shown in FIG 8. Instead the cord 31 could be used by itself. As the wings are pulled down, the intermediate zones 28A, 28B at least partially unfold, against the action of elastic strips 29. Thus, it will be possible substantially wholly to cover the sides of a carried load by suitable pulling on the wings, stretching the strips 29 and then making fast the long edges of those wings, as shown in FIGS. 6 and 8. When released from the load, the cover readily springs back to its original shape and dimensions as illustrated in FIG. 1, and so may immediately be rewound within the housing 10.

Figure 9:
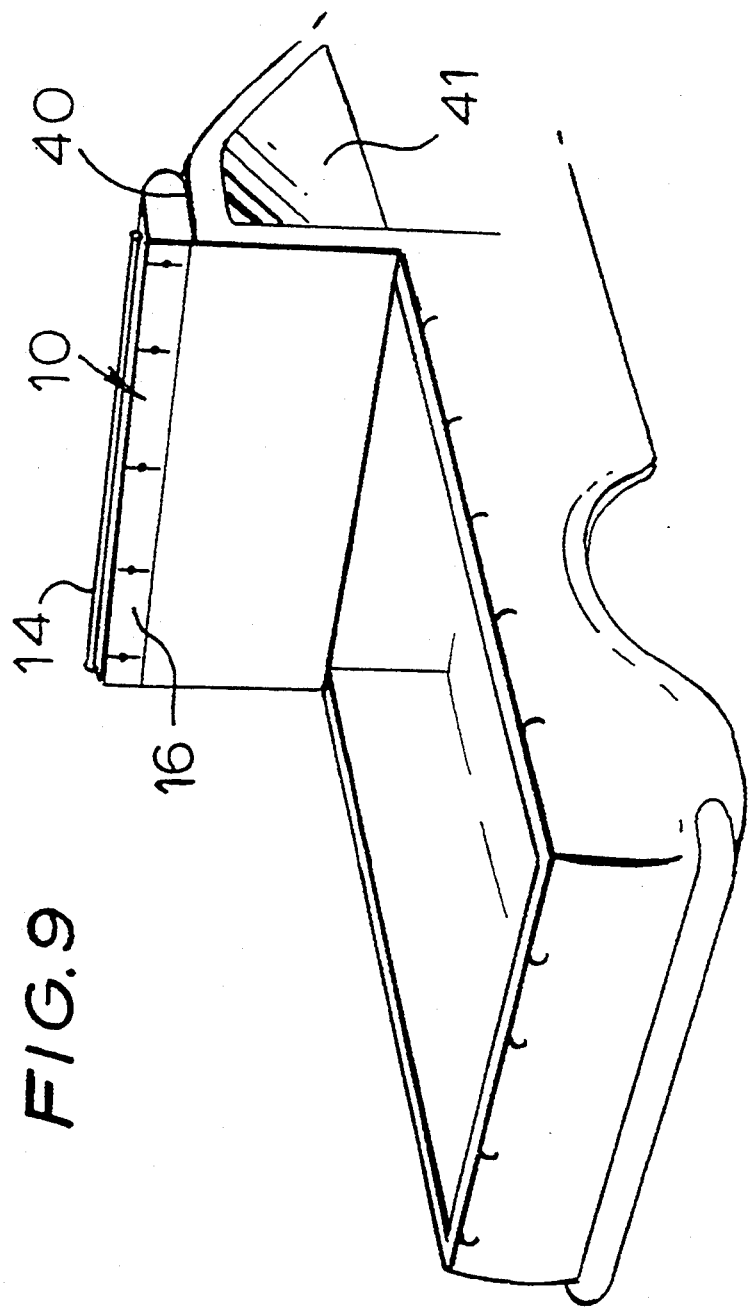
FIG. 9 is a diagrammatic view of the cover assembly mounted on the roof of a pick-up truck.

FIG. 9 shows the housing 10 mounted on the roof 40 of a cab 41 of a pick-up truck. Clips similar to those described above with reference to FIG. 7 and shown at 36 in that Figure may be used to secure the housing 10 in this position. Once a load has been placed within the pick-up truck, the cover may be extended over that load in a generally similar manner to that described above, with reference to the use of the cover in connection with a roof-rack.

FIG. 10 illustrates one end of a modified bar 14, arranged to assist the tying thereof to a part of a vehicle. Bar 14 is hollow, and at each end there is provided a slot 45 extending for a short distance from the bar end face. A pair of end caps 46 (only one of which is shown) fit into the ends of the bar, each end cap having a plug 47 the length of which is slightly shorter than the length of the slot 45. The two end caps 46 are connected together by an elastic cord 48 which passes through the bar 14, and which is provided with enlarged beads 49 spaced along the length thereof.

In use, the bar is secured by pulling the end caps 46 out of the bar, passing the cord 48 around suitable parts of the roof-rack, and then re-fitting the end caps to the bar. The elastic cord tensions the bar down to the vehicle, the cord passing through the slot 45, in the space between the end of plug 47 and the bottom of the slot. The beads 49 are too large to pass through that space, and so serve to lock the cord in the tightened-down position.

FIG. 11 shows a part of an alternative web, to replace that described above and shown in FIGS. 4 to 6. In the web of FIG. 11, there is a central section 50 of a material similar to that of the web of FIGS. 4 to 6. Along each of the two long edges 51 and 52 of the central section 50 there is a respective elastically-stretchable sheet-like marginal portion 53 and 54, each of which has means permitting the stretching and tying-down thereof, such as a series of eyelets 55 for receiving tie-cords, as has been described above with reference to FIG. 8. Also shown is a bar 14 corresponding to that of FIG. 4, for the tying-down of the free end of the web.

Figure 5:
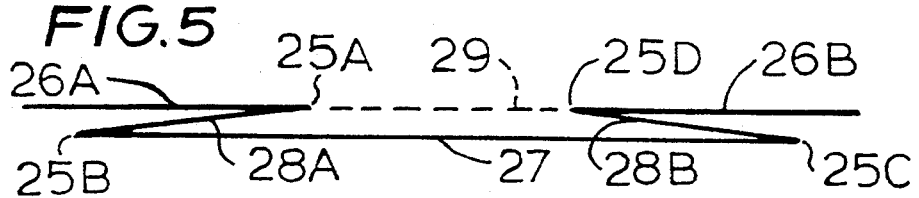
FIG. 5 is a diagrammatic cross-sectional view through the web of FIG. 4.

FIG. 12 illustrates a modified form of the web shown in FIG. 5, and insofar as it is appropriate, the same reference characters are employed. In this modified form, there are two extra folds 56 and 57 in the intermediate zone of the web, between folds 25A and 25B. These permit the web to be stretched out to a greater extent for a given sprung-back width. Also, in the web of FIG. 12, each elastic strip 29 is shown attached at 58 to the central region 27, as well as to the respective outer wing 26a, 26b.

I claim

1. A cover assembly for a load carried on a load-carrying area of a vehicle, comprising:
    a carrier adapted to be affixed to a part of the vehicle adjacent said load-carrying area thereof;
    a roller rotatably mounted on said carrier;
    a releasable lock means to restrain rotation of the roller;
    a web comprising an elongate sheet of a flexible substantially inextensible material which may be wound on said roller, the web having a free end which is outermost when the web is wound on said roller, the web having long edges and there are provided elastically-stretchable sheet-like marginal portions along said long edges, which portions are provided with means permitting the long free edges thereof to be secured to appropriate parts of the vehicle; and
    attachment means provided on said free end of the web, to permit the securing of said free end to another part of the vehicle which said other part is also adjacent said load carrying area.

2. A cover assembly as claimed in claim 1, wherein said substantially inextensible material comprises a sheet of one of the group consisting of a vinyl-coated textile material and a polyamide material.

3. A cover assembly for a load carried on a load-carrying area of a vehicle, comprising:
    a carrier adapted to be affixed to a part of the vehicle adjacent said load-carrying area thereof;
    a roller rotatably mounted on said carrier;
    a releasable lock means to restrain rotation of the roller;
    a web comprising an elongate sheet of flexible substantially inextensible material which may be wound on said roller, the web having a free end which is outermost when the web is wound on said roller, which web is folded along at least four lines each of which extends substantially parallel to the length of the web, whereby there are defined two outer wings, a central region, and a pair of intermediate zones which extend between a respective wing and the central region, there being resiliently extensible means which extend between opposed portions of the wings which said resilient extensible means at least partially overlie the central region; and attachment means provided on said free end of the web, to permit the securing of said end to another part of the vehicle which said other part is adjacent said load carrying area.

4. A cover assembly as claimed in claim 3, wherein each intermediate zone is provided with further folds parallel to the length of the web, whereby the intermediate zone is folded back on itself.

5. A cover assembly as claimed in claim 3, wherein the resiliently extensible means comprises a plurality of separate, resiliently extensible strips arranged with the strips parallel to one another and spaced apart along the length of the web.

6. A cover assembly as claimed in claim 5, wherein each resiliently extensible strip extends between and is secured at its two ends to the two wings, respectively.

7. A cover assembly as claimed in claim 5, wherein each resiliently extensible strip is secured at one end to a wing, and at its other end to the central region of the web of sheet-like material.

8. A cover assembly as claimed in claim 3, wherein the web has long free edges, and said edges are provided with a series of openings to which hooks, cords or ropes may be attached.

9. A cover assembly as claimed in claim 1, wherein said roller is rotationally spring-loaded in such a sense as to wind said web on to the roller.

10. A cover assembly as claimed in claim 3, wherein an electric motor is provided to effect rotation of said roller, when required.

11. A cover assembly as claimed in claim 3, wherein said releasable lock means associated with the roller has engaged and released settings and when in said engaged setting serves to prevent the roller turning in the sense which unwinds the web from the roller.

12. A cover assembly as claimed in claim 1, wherein said free end of the web is secured to a substantially rigid element extending transversely of the web.

13. A cover assembly as claimed in claim 1, wherein said carrier is in the form of a housing within which the roller is rotatably mounted, said housing having a slot through which the web passes.

14. A cover assembly as claimed in claim 1, wherein said carrier is adapted to be secured to a transverse member of a roof-rack of a motor vehicle.

15. A cover assembly as claimed in claim 3, wherein said substantially inextensible material comprises a sheet of one of the group consisting of a vinyl-coated textile material and a polyamide material.

16. A cover assembly as claimed in claim 3, wherein said roller is rotationally spring-loaded in such a sense as to wind said web on to the roller.

17. A cover assembly as claimed in claim 3, wherein said free end of the web is secured to a substantially rigid element extending transversely of the web.

18. A cover assembly as claimed in claim 3, wherein said carrier is in the form of a housing within which the roller is rotatably mounted, said housing having a slot through which the web passes.

19. A cover assembly as claimed in claim 3, wherein said carrier is adapted to be secured to a transverse member of a roof-rack of a motor vehicle.

* * * * *